(12) United States Patent
Watson et al.

(10) Patent No.: US 8,943,741 B2
(45) Date of Patent: Feb. 3, 2015

(54) MOUSETRAP

(75) Inventors: Duncan McLeod Watson, West Ryde (AU); Brendyn Murray Rodgers, Mount Waverly (AU)

(73) Assignee: Reckitt Benckiser (Australia) Pty, Limited, New South Wales (AU)

( * ) Notice: Subject to any disclaimer, the term of this patent is extended or adjusted under 35 U.S.C. 154(b) by 488 days.

(21) Appl. No.: 12/247,023

(22) Filed: Oct. 7, 2008

(65) Prior Publication Data

US 2009/0249680 A1 Oct. 8, 2009

(30) Foreign Application Priority Data

Apr. 7, 2008 (GB) .................................. 0806258.0

(51) Int. Cl.
*A01M 23/30* (2006.01)
*A01M 23/24* (2006.01)
(52) U.S. Cl.
CPC ...................................... *A01M 23/30* (2013.01)
USPC ................. 43/82; 43/81; 43/88; 43/90; 43/92
(58) Field of Classification Search
USPC .............................. 43/81, 81.5, 82, 83, 88–96
See application file for complete search history.

(56) References Cited

U.S. PATENT DOCUMENTS

| | | | | | |
|---|---|---|---|---|---|
| 28,820 | A | * | 6/1860 | Wright | 43/82 |
| 74,762 | A | * | 2/1868 | Leech | 43/81 |
| 83,074 | A | * | 10/1868 | McClure | 43/81 |
| 240,747 | A | * | 4/1881 | Melson | 43/82 |
| 437,179 | A | * | 9/1890 | Dennis | 43/81 |
| 640,244 | A | * | 1/1900 | Wever | 43/81 |
| 1,080,623 | A | * | 12/1913 | Brorby | 43/88 |
| 1,176,778 | A | * | 3/1916 | Rittelmann | 43/81 |
| 1,402,002 | A | * | 1/1922 | Meredith | 43/93 |
| 1,455,131 | A | * | 5/1923 | Ziola | 43/82 |
| 1,464,559 | A | * | 8/1923 | Britan | 43/81 |
| 1,592,155 | A | * | 7/1926 | Redford | 43/82 |
| 1,657,976 | A | * | 1/1928 | Soucy | 43/81 |
| 1,676,427 | A | * | 7/1928 | Dahl | 43/88 |
| 1,738,448 | A | * | 12/1929 | Rollins | 43/88 |
| 1,743,389 | A | * | 1/1930 | Poncelet | 43/81 |
| 1,745,609 | A | * | 2/1930 | Dorton | 43/96 |

(Continued)

FOREIGN PATENT DOCUMENTS

| | | | | |
|---|---|---|---|---|
| DE | 3402716 A1 | * | 8/1985 | ............ A01M 23/24 |
| EP | 954964 A1 | * | 11/1999 | ............ A01M 23/30 |

(Continued)

*Primary Examiner* — Darren W Ark
(74) *Attorney, Agent, or Firm* — Troutman Sanders LLP; Ryan A. Schneider (57) ABSTRACT

The invention provides a trap for capturing and/or killing a mouse, the trap comprising:
an enclosure comprising a base connected to at least one movable part and which houses a trigger; the trigger comprising an adhesive section;
wherein the at least one movable part is urged against the force of a biasing means from a first position wherein the trap is in a closed state into a second position in which the trap is in a set state;
wherein the at least one movable part is maintained in the second position by releasably engaging the trigger; and
wherein the trap is triggered upon the mouse contacting the adhesive section and elevating the trigger so as to disengage the trigger from the at least one movable part so that it moves from the second position to the first position under the force of the biasing means.

15 Claims, 7 Drawing Sheets

(56) References Cited

U.S. PATENT DOCUMENTS

| | | | | |
|---|---|---|---|---|
| 1,798,541 A * | 3/1931 | Kleffman | | 43/83 |
| 1,802,272 A * | 4/1931 | Rice | | 43/81 |
| 1,850,534 A * | 3/1932 | Clausen | | 43/88 |
| 2,068,492 A * | 1/1937 | Johnson | | 43/83 |
| 2,258,549 A * | 10/1941 | Drake | | 43/83 |
| 2,332,334 A * | 10/1943 | Morrison | | 43/81 |
| 2,416,481 A * | 2/1947 | Hollenbeck | | 43/81 |
| 2,426,973 A * | 9/1947 | McCrimmon | | 43/81 |
| 2,492,957 A * | 1/1950 | Blair | | 43/81 |
| 2,525,010 A * | 10/1950 | Allison | | 43/83.5 |
| 2,574,322 A * | 11/1951 | Fitzsimons | | 43/81 |
| 2,586,261 A * | 2/1952 | Rhines | | 43/82 |
| 2,597,814 A * | 5/1952 | Pirtle | | 43/92 |
| 2,684,553 A * | 7/1954 | Schroeder | | 43/81 |
| 2,724,209 A * | 11/1955 | Cain | | 43/83.5 |
| 2,871,613 A * | 2/1959 | Coelho | | 43/92 |
| 3,204,365 A * | 9/1965 | Sartin | | 43/81 |
| 3,640,015 A * | 2/1972 | Fisher | | 43/83.5 |
| 3,757,457 A * | 9/1973 | Martin | | 43/81 |
| 3,936,973 A * | 2/1976 | Larocque | | 43/81 |
| 3,992,803 A * | 11/1976 | Kaiser | | 43/83 |
| 4,216,606 A * | 8/1980 | Kaiser et al. | | 43/81 |
| 4,235,038 A * | 11/1980 | Sauvageau | | 43/82 |
| 4,366,642 A * | 1/1983 | Gardner et al. | | 43/82 |
| 4,403,438 A * | 9/1983 | West-Harron | | 43/81 |
| 4,425,732 A * | 1/1984 | Kania | | 43/81 |
| 4,557,068 A * | 12/1985 | Thomas et al. | | 43/96 |
| 4,578,893 A * | 4/1986 | Wickenberg | | 43/81 |
| 4,607,450 A * | 8/1986 | Kaiser et al. | | 43/83 |
| 4,665,644 A * | 5/1987 | Vajs et al. | | 43/82 |
| 4,803,799 A * | 2/1989 | Vajs et al. | | 43/82 |
| 4,852,294 A * | 8/1989 | Langli | | 43/81 |
| 4,866,876 A * | 9/1989 | Thompson | | 43/96 |
| 5,337,512 A * | 8/1994 | Krenzler | | 43/81 |
| 5,488,800 A * | 2/1996 | O'Hara | | 43/81 |
| 6,397,517 B1 * | 6/2002 | Leyerle et al. | | 43/88 |
| 6,415,544 B1 * | 7/2002 | Leyerle et al. | | 43/82 |
| 6,508,031 B1 * | 1/2003 | Johnson et al. | | 43/88 |
| 6,574,912 B1 * | 6/2003 | Johnson | | 43/88 |
| 6,832,447 B2 * | 12/2004 | Domigan et al. | | 43/94 |
| 7,117,631 B2 * | 10/2006 | Peters | | 43/81 |
| 7,162,832 B2 * | 1/2007 | Simpson et al. | | 43/81 |
| 7,757,429 B1 * | 7/2010 | Cambio | | 43/81 |
| 7,954,275 B2 * | 6/2011 | Frisch | | 43/81 |
| 8,104,222 B2 * | 1/2012 | Hovey | | 43/81 |
| 2006/0272197 A1 * | 12/2006 | Wiesener et al. | | 43/81 |
| 2007/0289200 A1 * | 12/2007 | Danielsson | | 43/82 |
| 2008/0178517 A1 * | 7/2008 | Han et al. | | 43/81 |
| 2009/0151222 A1 * | 6/2009 | Bruno et al. | | 43/88 |
| 2009/0151224 A1 * | 6/2009 | Nathan et al. | | 43/81 |
| 2010/0115824 A1 * | 5/2010 | Frisch | | 43/81 |
| 2010/0154288 A1 * | 6/2010 | Frisch | | 43/81 |
| 2010/0199544 A1 * | 8/2010 | Frisch | | 43/81 |
| 2014/0230312 A1 * | 8/2014 | Le Laidier et al. | | 43/82 |

FOREIGN PATENT DOCUMENTS

| | | | | | |
|---|---|---|---|---|---|
| EP | 1731033 | A1 * | 12/2006 | | A01M 23/24 |
| FR | 2637460 | A1 * | 4/1990 | | A01M 23/24 |
| GB | 2332356 | A | * | 6/1999 | A01M 23/30 |
| JP | 02203731 | A | * | 8/1990 | A01M 23/24 |
| JP | 2004041045 | A | * | 2/2004 | A01M 23/24 |
| WO | WO 8605948 | A1 * | 10/1986 | | A01M 23/24 |
| WO | WO 9963811 | A1 * | 12/1999 | | A01M 23/30 |
| WO | WO 0209512 | A1 * | 2/2002 | | A01M 23/30 |
| WO | WO 2005074680 | A1 * | 8/2005 | | A01M 23/30 |
| WO | WO 2005099451 | A1 * | 10/2005 | | A01M 23/30 |
| WO | WO 2006130095 | A1 * | 12/2006 | | A01M 23/24 |

* cited by examiner

MOUSETRAP

FIELD OF THE INVENTION

The present invention relates to mousetraps for trapping and/or killing mice, in particular, domestic mice.

BACKGROUND OF THE INVENTION

Mice, although small, can still cause much damage. They destroy articles such as food, books, furniture and even appliances with their gnawing, urine and faeces. Another undesirable trait associated with mice, particularly in domestic environments, is their association with a variety of human diseases, such as for example, asthma. Mice can also spread a variety of organisms that can cause diseases of humans and pets. These include a variety of food poisoning bacteria like *Salmonella, Shigella, Escherichia coli* (*E. coli*), and others. While the risk of mouse invasion is able to be somewhat controlled or minimised by preventing food waste such as crumbs accumulating in the home, or ensuring that stored food is isolated from the external environment in, for example, sealed containers, it is not always possible to ensure that no food will be left exposed for a period of time. Also, minimising the risk of mice invasion by sealing of cracks, spaces and openings such as vents, pipes and chimney access points can be an expensive, labour intensive and a time consuming exercise and is not always possible.

Traditional methods of dealing with mouse invasion in the home involves the use of poisoned baits (rodenticides) that contain anticoagulants, such as warfarin, pival, brodifacoum, difethialone and chlorophacinone. Such baits, while effective, are nevertheless toxic and are therefore undesirable for use in the home, particularly those in which children and pets reside. In addition, poisoned mice often die in inaccessible locations thereby resulting in an unpleasant odor upon death of the mouse. To circumvent these problems, mousetraps are often employed instead of poisoned baits. Traps are generally preferred as these are less hazardous to use around children and pets. Because mice are caught by the trap, there is less chance of odor from mice dying in wall voids or other inaccessible areas. Mousetraps in the form of wooden-based snap traps are common.

Whilst most mousetraps are generally effective, they have the problem of exposing the homeowner, for example, to the highly undesirable task of disposing of the dead mouse once trapped. Another associated disadvantage with conventional mousetrap is that once the mouse has entered the trap and accessed the bait, depending on the mouse response time, the mouse may still be able to escape by responding quickly enough to thereby avoid capture once the trap has been triggered. Another disadvantage associated with many mousetraps is they allow the possibility of the mouse escaping even after entering the mousetrap as a result of poor trap design or ineffective trap triggering systems.

While recognising the shortcomings of prior art mousetraps, the present inventors have sought to overcome these deficiencies with a mousetrap that is able to readily capture and secure a mouse or the like with little or no possibility of escape. Moreover, when captured, the mouse is in the best location on the trap to ensure an efficient kill. Such traps are desirably simple and cost effective to manufacture and are also able to efficiently trap mice.

SUMMARY OF THE INVENTION

The invention provides a trap for capturing and/or killing a mouse, the trap comprising:

an enclosure comprising a base connected to at least one movable part and which houses a trigger; the trigger comprising an adhesive section;

wherein the at least one movable part is urged against the force of a biasing means from a first position wherein the trap is in a closed state into a second position in which the trap is in a set state;

wherein the at least one movable part is maintained in the second position by releasably engaging the trigger; and wherein the trap is triggered upon the mouse contacting the adhesive section and elevating the trigger so as to disengage the trigger from the at least one movable part so that it moves from the second position to the first position under the force of the biasing means.

According to the trap of the invention, the mouse, on contacting the adhesive pad, will advantageously be held by the adhesive in an optimum position to achieve most effective capture and/or kill (ie in an "optimum capture/kill position"). Moreover, by virtue of the adhesive section, for example, an adhesive pad, located on the trigger, the mousetrap is able to be triggered by elevation of the pad by the mouse as opposed to conventional traps in which triggering is often effected by depression of a triggering mechanism. The novel triggering system of the invention provides a more stable and efficient capture/kill device as the mouse has to be in the "optimum capture/kill position" in order to trigger the mousetrap and so false triggering (ie when non capture or no kill occurs after trigger) is avoided or minimised.

It will be appreciated that the term "closed state" as used in the description encompasses the state of the trap when it is not set (ie is empty or contains a captured mouse).

It will also be appreciated that any type of adhesive that is sufficiently strong to hold the mouse in the "optimum kill position" and ensures lifting of the trigger as the mouse tries to escape is suitable for use in the trap of the invention. Suitable adhesives include, but are not limited to, high tack hot melt adhesives (block polymers, polyamides) and double sided adhesive tapes or labels.

Whilst the trap according to the invention may be re-set after capture and re-used, desirably, the trap according to the invention is a single-use trap to be disposed after capture and/or killing of a mouse. Accordingly, it will be appreciated that the trap be easy and inexpensive to manufacture. Materials suitable for manufacturing the trap include, but are not limited to, polypropylene, ABS, polystyrene and polyethylene.

In one embodiment, the enclosure comprises one movable part in the form of a plate. Preferably, the plate is hinge-connected to the plate. Preferably also, the plate is configured so as to substantially conceal and isolate from the external environment a captured mouse.

In an alternative embodiment, the enclosure comprises two movable parts each in the form of a comb, wherein each movable part comprises a series of spaced apart fingers which are able to interleave when the trap is in the closed state so as to substantially conceal and isolate from the external environment a captured mouse.

Particularly in traps which are desired to act as "kill traps" as opposed to "live traps" in which the mouse is simply captured, the one or more or more movable parts of the trap may further comprise one or more projections on an internal surface if the movable part, wherein the one or more projections assist in killing a mouse when the one more movable parts move from the second position to the first position under the force of the biasing means.

Preferably, the one or more projections are in the form of a bar. The bar may also comprise a series of teeth projecting from its periphery which assist in killing a mouse when the one more movable parts move from the second position to the first position under the force of the biasing means.

The biasing means may be any means capable of returning the one or more movable parts from the second position to the first position. Preferably, the biasing means is a spring.

Preferably, the at least one movable part is hinge-connected to the base, however, it will be appreciated that other forms of connection are possible, provided the one or more movable parts are able to move from the first position to the second position in relation to the base.

Preferably, the trap according to the invention is a single-use disposable trap which allows a user to easily and hygienically dispose of a trapped mouse. Additionally, the trap is desirably configured so that the enclosure is able to conceal a trapped mouse to a large extent (ie 70-80%), but still allow a user to see that a mouse is trapped when the trap is in the closed state.

The invention further extends to a method of capturing and/or killing a mouse comprising the use of a trap as hereinbefore described. The invention also extends the use of a trap according to any one of the preceding claims to capture and/or kill a mouse.

The invention will now be described with reference to alternative and non-limiting embodiments of the invention as depicted in the following figures.

BRIEF DESCRIPTION OF THE FIGURES

FIG. 3 shows the trap of FIG. 1 in cut-section view showing the trap during the stages between a set position and a closed position. In particular.

FIG. 6 shows the trap of FIG. 4 in cut-section view showing the trap during the stages between a set position and a closed position. In particular.

EMBODIMENTS OF THE INVENTION

Figure 1:
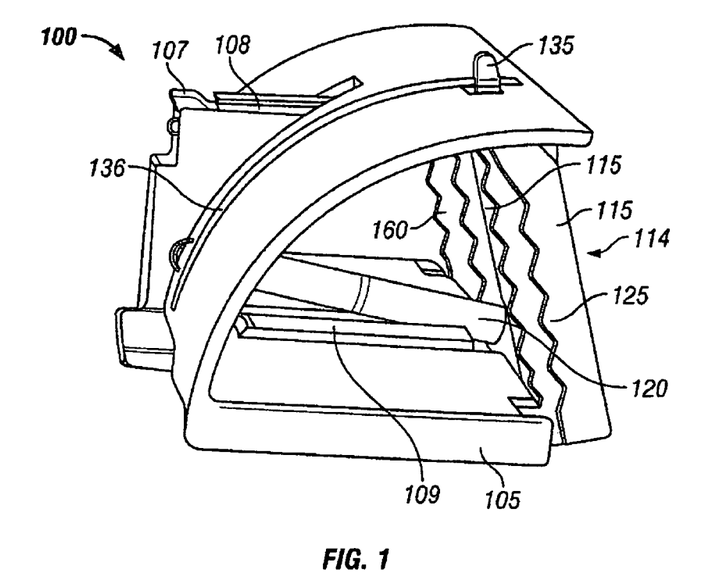
FIG. 1 shows the trap in perspective view according to one embodiment of the invention.

Referring to FIG. 1, the trap 100 according to an embodiment of the invention is shown in a set state. Trap 100 comprises an enclosure formed from a base 105 that is hinge-connected to a movable part wherein the movable part comprises plate 114 and prop 108. Trap 100 is able to be manually set from a first (closed) position to a second (open) position by moving lever 135 along slot 136 located on the base 105. Lever 135 is connected to plate 114 and movement of lever 135 along slot 136 acts to move plate 114 from a closed position to an open position to thereby set the trap.

In moving lever 135 along slot 136 to set the trap, plate 114 is urged against the force of a biasing means, spring 120. As can be more clearly seen in FIG. 2, spring 120, is connected to plate 114. In order to trigger trap 100, whereupon plate 114 moves under the force of spring 120 from an open position to a closed position, a mouse in contact with adhesive pad 109 located on trigger 107 (shown more clearly in FIGS. 2 and 3), lifts the trigger in trying to escape upon contact with the adhesive.

Figure 2:
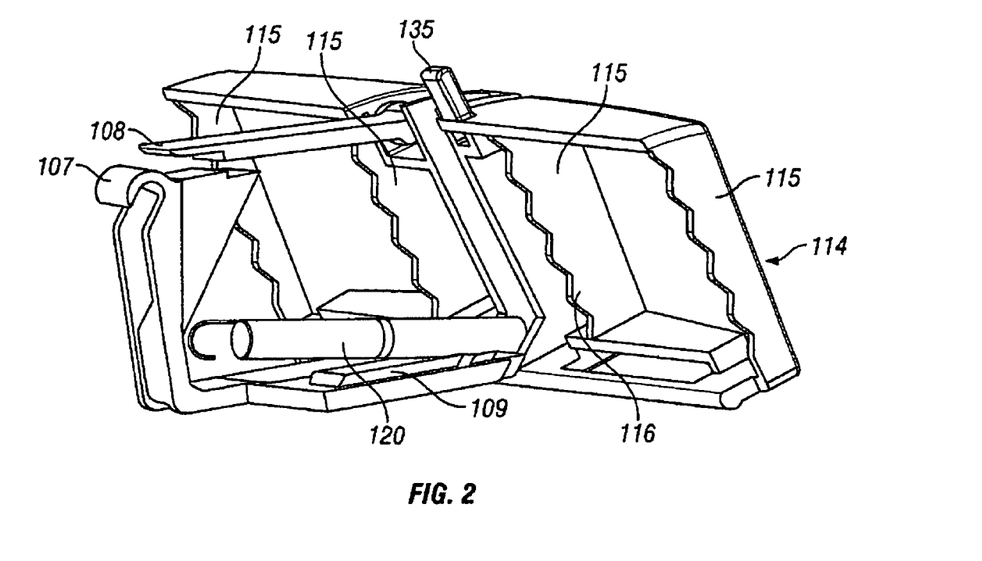
FIG. 2 shows the trap of FIG. 1 in perspective view with part of the enclosure removed so as to more clearly show the trap internal parts.
Figure 3A:
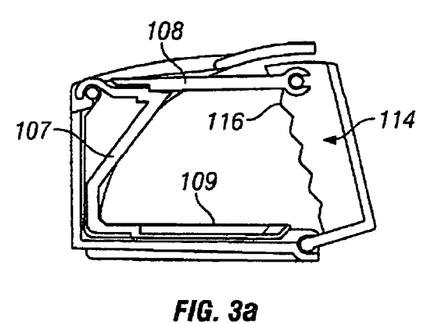
FIG. 3(a) shows the trap in an open (or set) position.
Figure 3B:
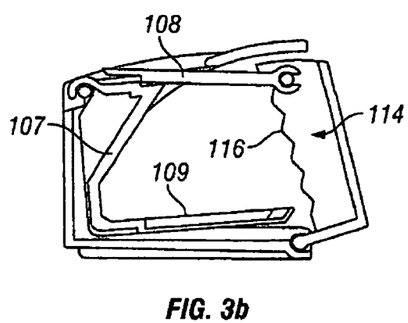
FIGS. 3(b) and 3(c) show the trap in an activated state once triggered (mouse not shown)
Figure 3C:
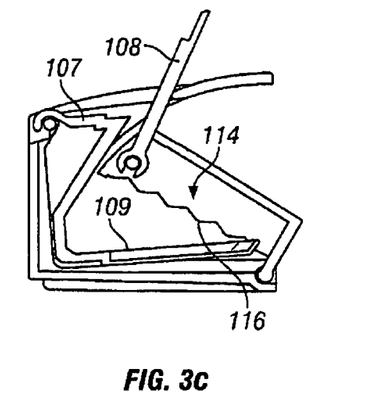
Figure 3D:
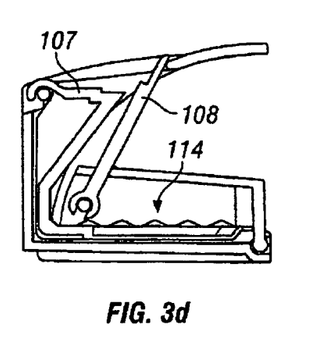
FIG. 3(d) shows the trap in a closed position when the trap is empty.

The mechanism of the trigger is more clearly explained with reference to FIGS. 2 and 3. Referring to FIG. 2, this shows the embodiment of FIG. 1 with part of the enclosure removed for clarity. Trigger 107, comprising adhesive pad 109, abuts and engages prop 108 (see FIG. 3) when trap 100 is in a set state ready to trap a mouse. The mouse, on entry into the set trap 100, will come into contact with the adhesive located on adhesive pad 109 and will be held in this position by the adhesive ready for capture and/or kill. Capture occurs once the mouse attempts to escape thereby lifting adhesive pad 109 and hence trigger 107 which causes prop 108 to disengage from trigger 107. Once prop 108 disengages trigger 107, plate 114 is forced from the second (open) position to the first (closed) position to thereby capture the mouse within the enclosure. In order to assist in killing the mouse, in the embodiment of FIGS. 1 to 3, plate 114 comprises a series projections each in the form of a bar 115 further comprising a series of teeth 116 which impact or impale a captured mouse as plate 114 moves from the second to the first position.

An alternative embodiment of the trap according to the invention is shown and described with reference to FIGS. 4 to 7.

Figure 4:
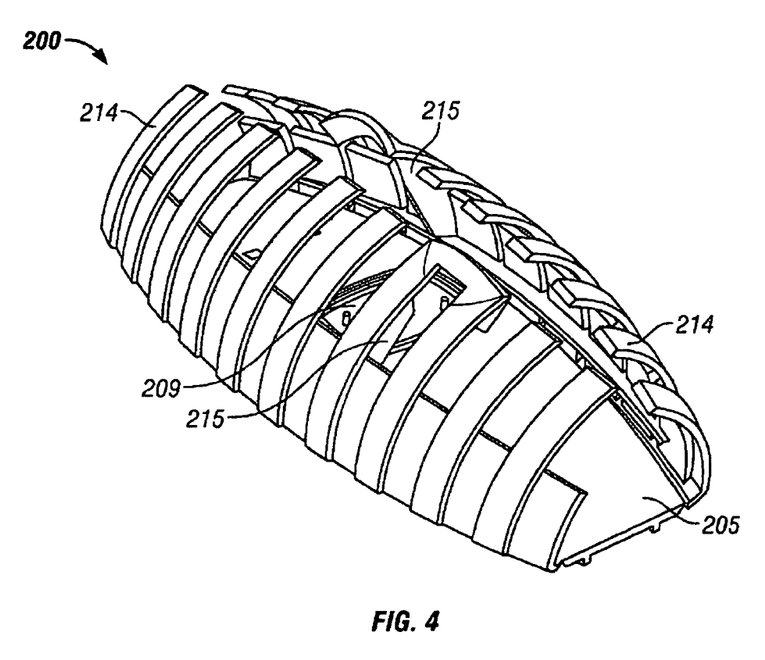
FIG. 4 shows the trap in perspective view according to an alternative embodiment of the invention.
Figure 5:
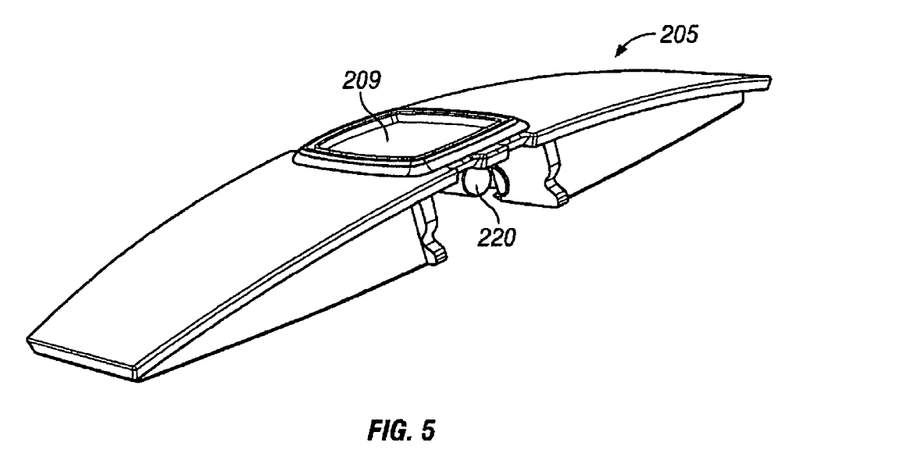
FIG. 5 shows the trap of FIG. 4 in perspective view with part of the enclosure removed so as to more clearly show the trap internal parts.
Figure 6A:
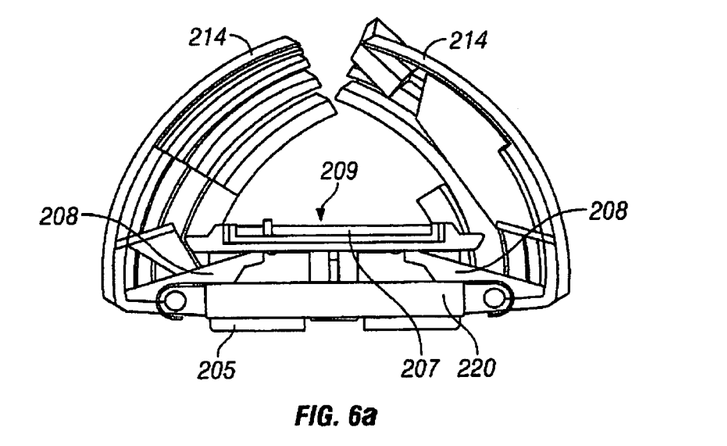
FIG. 6(a) shows the trap in an open (or set) position.
Figure 6B:
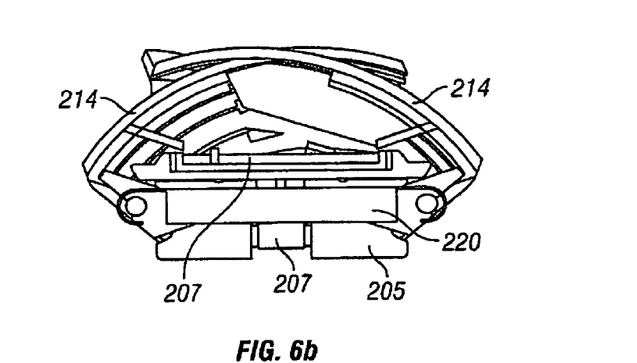
FIG. 6(b) shows the trap in a closed trap position (mouse not shown)
Figure 6C:
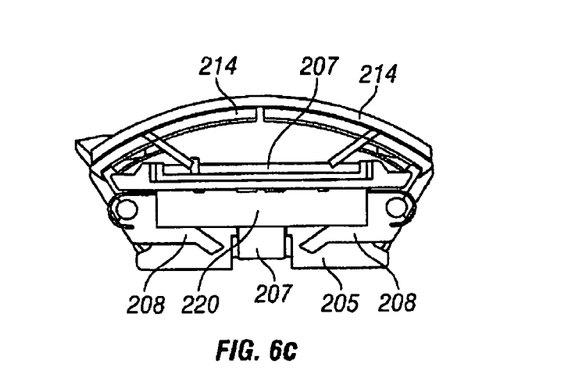
FIG. 6(c) shows the trap in a closed position when the trap is empty.
Figure 7:
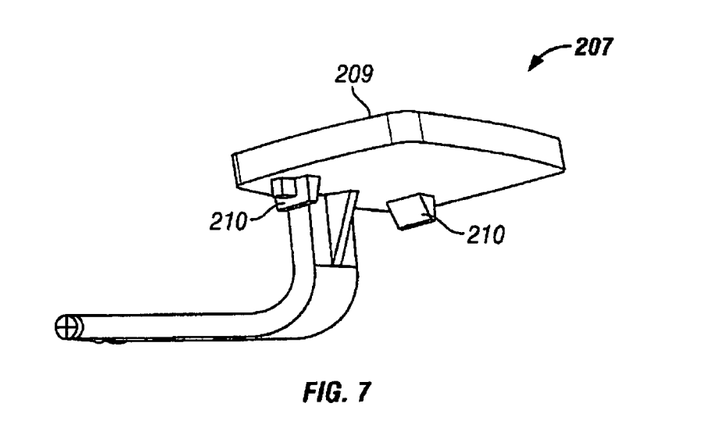
FIG. 7 shows the trigger of the embodiment shown in FIGS. 4 to 6.

Referring to FIG. 4, trap 200 according to this embodiment of the invention is shown in a set state. Trap 200 comprises an enclosure formed from a base 205 (shown clearly in FIG. 5) and two movable parts, wherein base 205 is hinge-connected to the two the movable parts. Furthermore, each movable part comprises a comb 214 with prop 208 (see FIG. 6). Trap 200 is able to be manually set from a first (closed) position to a second (open) position by prising apart combs 214 against the force of a biasing means (spring 220) to thereby engage each prop 208 with clips 210 located on trigger 207 (see FIG. 7).

In order to trigger trap 200, whereupon combs 214 move under the force of spring 220 from an open position to a closed position, a mouse in contact with adhesive pad 209 located on trigger 207 (shown more clearly in FIGS. 5 and 7), lifts trigger 207 in trying to escape upon contact with the adhesive. Upon lifting trigger 207, props 208 are caused to disengage clips 210 located on trigger 207, thereby allowing combs 214 to move from the second (set) position to the first (closed) position under the force of spring 220 thereby capturing the mouse.

In order to assist in killing the mouse, in the embodiment of FIGS. 4 to 7, combs 214 comprise projections in the form of bars 215 which impact or impale a captured mouse as combs 214 move from the second to the first position. Whilst not shown in FIGS. 4 to 7, each bar 215 may further comprise teeth, spikes, or such like which assist in achieving efficient kill of the mouse upon capture.

It will be appreciated by persons skilled in the art that numerous variations and/or modifications may be made to the invention as shown in the specific embodiments described herein without departing from the scope of the invention as broadly described. The present embodiments are, therefore, to be considered in all respects as illustrative and not restrictive.

The invention claimed is:

1. A trap for capturing and/or killing a mouse, the trap comprising:
an enclosure comprising a base connected to movable parts and a housing a trigger;
the moveable parts comprising a plate and a prop,
wherein the prop comprises two ends, a first end of said two ends is pivotally attached to a part of the plate, and the second end of said two ends is compressed against and abuts a part of the trigger when the trap is in a set state,
wherein the plate is pivotally attached to a part of the base and is movable with respect to the base when the trap is reconfigured from the set state to a closed state in response to the trap being triggered by a mouse,
wherein the plate has a length defined between a first end of the plate and a second end of the plate,
the trigger comprising an adhesive section pivotally connected to a part of the trap, wherein in a first position the adhesive section is substantially parallel to the base and in a second position the adhesive section is positioned more distantly spaced from the base than in the first position,
wherein the trap further comprises a biasing means which urges the plate towards the base and towards the adhesive section when the trap is reconfigured from the set state to the closed state; and,
wherein the trap comprises two open ends at opposite ends of the base, one of the two open ends at each of the opposite ends thereof, said two open ends open to an interior of the trap when the trap is in the set state;
wherein the adhesive section of the trigger is positioned between the two open ends and within the interior of the trap;
wherein the trap is configured to be triggered upon the mouse contacting the adhesive section and elevating the adhesive section of the trigger away from the base so as to disengage the trigger from the prop so that the prop is no longer compressed against the trigger, and whereinafter and under a force of the biasing means, the plate moves towards the base and towards the adhesive section and trapping and/or killing a mouse between the base and the plate under the force of the biasing means, and when in the closed state, at least 70% of the captured and/or killed mouse is concealed by the enclosure.

2. A trap according to claim 1 wherein the plate further comprises one or more projections on an internal surface thereof, wherein the one or more projections are configured to assist in killing the mouse when the plate moves, within the enclosure, under the force of the biasing means when the trap is reconfigured from the set position to the closed position.

3. A trap according to claim 2 wherein the one or more projections are in the form of a bar.

4. A trap according to claim 3 wherein the bar comprises a series of teeth projecting from a periphery of the bar that are configured to assist in killing the mouse when the plate moves, within the enclosure, under the force of the biasing means.

5. A trap according to claim 2, wherein the one or more projections further comprise a plurality of spaced apart projections which are present.

6. A trap according to claim 2, wherein the one or more projections further comprise at least 4 projections which are present.

7. A trap according to claim 1 wherein the biasing means is a spring.

8. A trap according to claim 1 wherein the plate is pivotally attached to a part of the base by being hinged to a side of the base.

9. A trap according to claim 1, wherein the adhesive section of the trigger is located away from each of the open ends of the trap.

10. A trap according to claim 9, wherein the adhesive section of the trigger is located within the interior of the trap and is approximately equidistant from each of the open ends of the trap.

11. A trap according to claim 9, wherein a length of the plate is approximately equal to a distance between the two open ends of the trap.

12. A trap according to claim 1, wherein the adhesive section of the trigger when in the first position is located in a cavity or recess present in the base.

13. A trap according to claim 12, wherein a top of the adhesive section of the trigger is approximately coplanar with a top surface of the base within the interior of the trap.

14. A trap according to claim 1, wherein the enclosure, the base, and the plate define a tunnel-like passage between the two open ends of the trap.

15. A method of capturing and/or killing a mouse comprising trapping and/or killing a mouse in a trap according to claim 1.

* * * * *